(12) United States Patent
Gao et al.

(10) Patent No.: US 8,599,335 B2
(45) Date of Patent: Dec. 3, 2013

(54) LIQUID CRYSTAL DISPLAY PANEL HAVING A POLARIZATION ADJUSTING LAYER AND LIQUID CRYSTAL DISPLAY DEVICE

(75) Inventors: Haikuo Gao, Beijing (CN); Dae Keun Yoon, Beijing (CN); Xiaopan Zheng, Beijing (CN); Ji Chen, Beijing (CN); Zhi Li, Beijing (CN); Xiuyun Chen, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 180 days.

(21) Appl. No.: 13/228,098

(22) Filed: Sep. 8, 2011

(65) Prior Publication Data

US 2012/0062818 A1    Mar. 15, 2012

(30) Foreign Application Priority Data

Sep. 10, 2010    (CN) ...................... 2010 2 0528182 U

(51) Int. Cl.
*G02F 1/1335* (2006.01)
*G02B 5/30* (2006.01)

(52) U.S. Cl.
USPC ........................ 349/96; 359/494.01

(58) Field of Classification Search
USPC .................................. 349/96, 112; 359/494.01
See application file for complete search history.

(56) References Cited

U.S. PATENT DOCUMENTS

2010/0182551 A1*    7/2010 Tochigi et al. ................. 349/112
2011/0007248 A1*    1/2011 Yonezawa et al. .............. 349/96

FOREIGN PATENT DOCUMENTS

JP            02184804 A  *  7/1990
WO    WO 2009113218 A1  *  9/2009

\* cited by examiner

*Primary Examiner* — Michael Caley
(74) *Attorney, Agent, or Firm* — Ladas & Parry LLP

(57) ABSTRACT

A liquid crystal display panel according to an embodiment of the present invention comprises: a backlight source; a liquid crystal cell; and a polarization adjusting layer disposed outside the liquid crystal cell and used to adjust the polarization direction of the linear polarized light emitted from the liquid crystal cell and transmitted through the polarization adjusting layer, wherein the polarization adjusting layer comprises a base body and optical anisotropic crystal grains dispersed within the base body. Also a liquid crystal display device is provided.

17 Claims, 1 Drawing Sheet

LIQUID CRYSTAL DISPLAY PANEL HAVING A POLARIZATION ADJUSTING LAYER AND LIQUID CRYSTAL DISPLAY DEVICE

BACKGROUND

Embodiments of the present invention relate to a liquid crystal display (LCD) panel and a liquid crystal display device.

As shown in FIG. 1, a conventional liquid crystal display panel mainly comprises a backlight source 10 and a liquid crystal cell 20. The liquid crystal cell 20 comprises two substrates, that is, a lower substrate 21 and an upper substrate 22 with a liquid crystal layer 23 interposed therebetween. A color filter layer and a common electrode layer may be disposed on the inner side of the upper substrate 22; an array structure layer, pixel electrodes and so on may be disposed on the inner side of the lower substrate 21. A lower polarizer 24 is disposed on the outer side of the lower substrate 21, an upper polarizer 25 is disposed on the outer side of the upper substrate 22, and the polarization direction of the upper polarizer 25 is perpendicular to the polarization direction of the lower polarizer 24. During an image being displayed, the electrodes respectively formed on the two substrates of the liquid crystal cell 20 apply an electric field to the liquid crystal layer 23 to control the orientation of the liquid crystal molecules in the liquid crystal layer 23, so that the polarization direction of the light emitted from the backlight source 10 and passing through the liquid crystal layer is changed, and thus, the intensity of the light having transmitted through the liquid crystal cell 20 can be controlled, and then with the help of color filters, a corresponding image can be displayed on the LCD panel.

In the conventional liquid crystal display panel as shown in FIG. 1, the light emitted out from the upper polarizer 25 on the outer side of the upper substrate 22 is the linear polarized light and not natural light, and therefore, a viewer would easily feel his/her eyes tired in viewing images displayed on such liquid crystal display panel. Therefore, a liquid crystal display that outputs circle polarized light is proposed, and this kind of liquid crystal display can alleviate user's eye fatigue to some extent. However, the liquid crystal display outputting linear polarized light or circle polarized light outputs only a single kind of polarized light, and therefore, the eye fatigue cannot be eliminated well.

SUMMARY

Embodiments of the present invention provide a liquid crystal display panel and a liquid crystal display device.

The liquid crystal display panel according to an embodiment of the present invention comprises: a liquid crystal cell; a backlight source for illuminate the liquid crystal cell; and a polarization adjusting layer disposed on an outer side of the liquid crystal cell and used to adjust the polarization direction of linear polarized light emitted out from the liquid crystal cell and passing through the polarization adjusting layer, wherein the polarization adjusting layer comprises a base body and optical anisotropic crystal grains dispersed within the base body.

The liquid crystal display device according to an embodiment of the present invention comprises: a liquid crystal display panel, comprising: a liquid crystal cell; a backlight source for illuminate the liquid crystal cell; and a polarization adjusting layer disposed on an outer side of the liquid crystal cell and used to adjust the polarization direction of linear polarized light emitted out from the liquid crystal cell and passing through the polarization adjusting layer, wherein the polarization adjusting layer comprises a base body and optical anisotropic crystal grains dispersed within the base body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

Embodiment of the invention being thus described, it will be obvious that the same may be varied in many ways. Such variations should not to be regarded as a departure from the spirit and scope of the invention, and all such modifications as would be obvious to those skilled in the art are intended to be included within the scope of the following claims.

Figure 1:
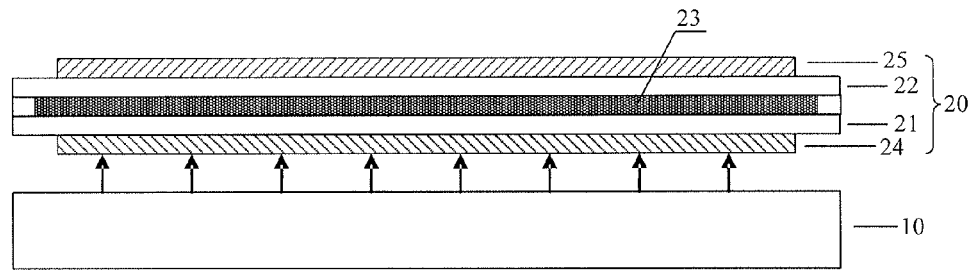
FIG. 1 is a structural schematic view of a conventional liquid crystal display panel.
Figure 2:
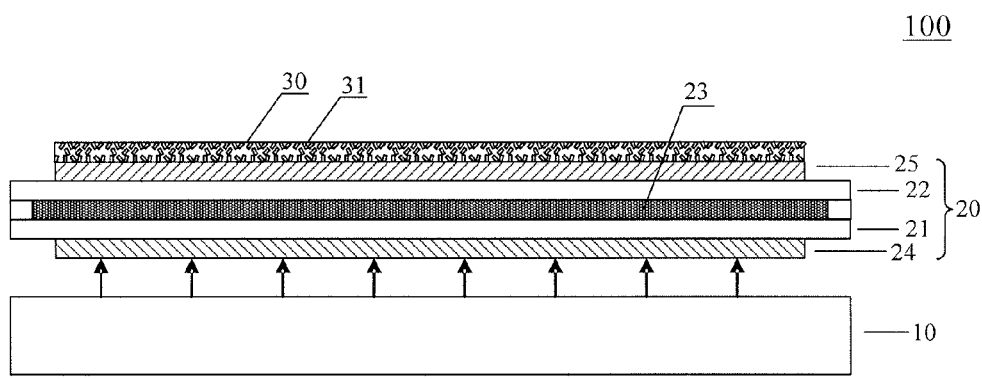
FIG. 2 is a structural schematic view of a liquid crystal display panel according to an embodiment of the present invention.

FIG. 2 is a structural schematic view of a liquid crystal display (LCD) panel according to an embodiment of the present invention. As shown in FIG. 2, the liquid crystal display panel 100 comprises a backlight source 10, a liquid crystal cell 20 and a polarization adjusting layer 30. The backlight source 10 is arranged below the liquid crystal cell 20, and the light emitted from the backlight source 10 illuminates the liquid crystal cell 20 for displaying. The polarization adjusting layer 30 is disposed outside the liquid crystal cell 20, i.e., on the upper side of the liquid crystal cell 20 in the drawing, and optical anisotropic crystal grains 31 are dispersed within the polarization adjusting layer 30. These optical anisotropic crystal grains 31 are, for example, evenly or randomly dispersed.

The liquid crystal cell 20 comprises two substrates 21 and 22 with a liquid crystal layer 23 interposed therebetween, a lower polarizer 24 is disposed on the outer side of the lower substrate 21, adjacent to the backlight source 10 in the two substrates, an upper polarizer 25 is disposed on the outer side of the upper substrate 22, away from the backlight source 10 in the two substrates, and the polarization adjusting layer 30 is arranged on the outer side of the upper polarizer 25. The polarization direction of the upper polarizer 25 is perpendicular to the polarization direction of the lower polarizer 24.

Here, if the backlight source 10 can directly emit linear polarized light, the lower polarizer 24 can be omitted in the liquid crystal display panel 100 according to the embodiment of the present invention.

Alternatively, the lower polarizer 24 can be disposed on the inner side of the upper substrate 22 and the light emitted from the backlight source 10 transmits through the liquid crystal layer 23 after passing through the lower polarizer 24. The polarization adjusting layer 30 is disposed on the outer side of the upper substrate 22, as long as the polarized light emitted out from the liquid crystal cell 20 can transmit through the polarization adjusting layer 30 and at the same time can be modulated by the polarization adjusting layer 30. Without departing from the teaching of the embodiment, the way to obtain the polarized light, the way to arrange the polarizers and so on in the liquid crystal cell are not limitative.

Figure 3:
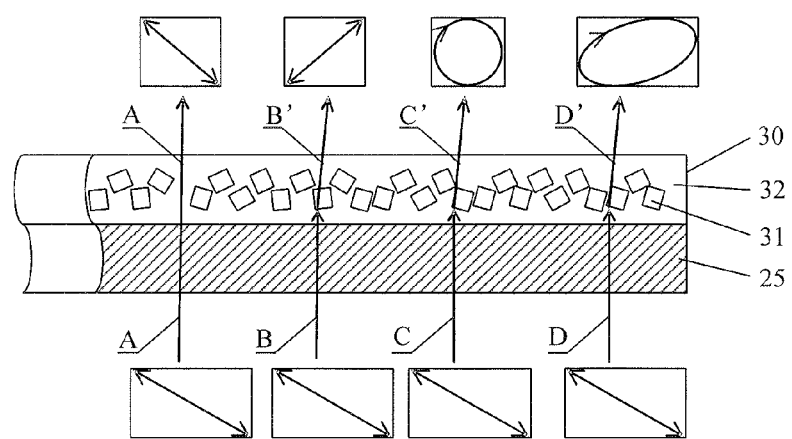
FIG. 3 is a schematic view for showing the working principle of the polarization adjusting layer shown in the FIG. 2.

As shown in FIG. 3, the polarization adjusting layer 30 comprises a base body 32 and optical anisotropic crystal grains 31. The optical anisotropic crystal grains 31 are dispersed within the base body 32, for example, formed of a polyester material, thus forming a polarization adjusting film. The polarization adjusting film can be provided individually or can be provided in combination with the upper polarizer 25 so as to form a composite film. The sizes of the optical anisotropic crystal grains 31 at the different positions in the polarization adjusting film may be non-uniform, the thicknesses of the polarization adjusting layer 30 along a direction perpendicular to the polarization adjusting layer 30 may be non-uniform, and the optical axis directions of the optical anisotropic crystal grains 31 dispersed at different positions in the polarization adjusting layer 30 are not uniform, as long as the polarized light can be adjusted to become non-uniform at the different positions so that the polarization directions of the light emitted from the polarization adjusting layer 30 are not along one direction only, and the light is similar to or works effectively as natural light. The polyester material of the base body of the polarization adjusting layer 30 may comprise polyethylene terephthalate (PET), and the optical anisotropic crystal grain 31 may be double reflection crystal grains, for example, artificial crystal grains or native crystal grains, such as quartz grains, calcite grains or the like.

Hereinafter, how the polarization adjusting layer 30 adjusts the single kind of polarized light emitted out from the upper polarizer 25 will be explained with reference to FIG. 3. As shown in FIG. 3, for example, the polarized light is adjusted by the polarization adjusting layer 30 comprising the optical anisotropic crystal grains 31 therein in the following:

(1) linear polarized light A is directly transmitted through a gap between crystal grains 31, and the polarization direction thereof is not changed;

(2) linear polarized light B passes through crystal grains 31; then the light path difference of the "o" light component and the "e" light component of the linear polarized light B becomes odd multiples of $\lambda/2$, and the polarization direction of the linear polarized light B is changed, and the linear polarized light B is transformed to linear polarized light B' after passing through the polarization adjusting layer 30;

(3) linear polarized light C passes through crystal grain 31; then the light path difference of the "o" light component and the "e" light component of the linear polarized light C becomes odd multiples of $\lambda/4$, and the linear polarized light C is transformed to circle polarized light C' after passing through the polarization adjusting layer 30;

(4) linear polarized light D passes through crystal grains 31; then the phase difference is formed between the "o" light component and the "e" light component of the linear polarized light D, and the linear polarized light D is transformed to the elliptical polarized light after passing through the polarization adjusting layer 30, and the phase differences between the "o" light component and the "e" light component are different at the different positions, and thus, various types of elliptical polarized light can be obtained.

By using the above structure, the linear polarized light A, the linear polarized light B and the linear polarized light C and the linear polarized light D which originally have the same single polarization direction become the linear polarized light A, the linear polarized light B', and the circle polarized light C' which have different polarization directions from each other and the various types of elliptical polarized light D', so that the polarization directions of the light emitted out from the polarization adjusting layer 30 are not along only one direction any more, the emitted light is more similar to or work effectively as natural light, or can be called as quasi-natural light.

The liquid crystal display panel according to the present embodiment can emit linear polarized lights which have the different polarization directions from each other and various types of elliptical polarized light, as compared with linear polarized light having a single polarization direction, the light emitted out from such liquid crystal display panel is more similar to or work effectively as natural light, and thus, when viewing images displayed on the liquid crystal display panel according to the embodiment, a viewer would feel better without fatigue substantially.

For example, the above mentioned polarization adjusting layer 30 having a desirable size can be formed by mixing optical anisotropic crystal grains 31 and particles of the raw material to form the base body 32 together to obtain a mixture, heating the mixture to obtain a molten body, and then shaping, cooling and cutting the molten body.

The liquid crystal display panel according to the above mentioned embodiment can be applied to a liquid crystal display device to form the liquid crystal display device having the above mentioned technical effects.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A liquid crystal display panel, comprising:
a liquid crystal cell;
a backlight source for illuminate the liquid crystal cell; and
a polarization adjusting layer disposed on an outer side of the liquid crystal cell and used to adjust the polarization direction of linear polarized light emitted out from the liquid crystal cell and passing through the polarization adjusting layer,
wherein the polarization adjusting layer comprises a base body and optical anisotropic crystal grains dispersed within the base body,
wherein the base body of the polarization adjusting layer comprises polyethylene terephthalate (PET),
the linear polarized light after passing through the polarization adjusting layer is adjusted as a light comprising the linear polarized light, another linear polarized light being different from the linear polarized light, a circle polarized light and various types of elliptical polarized light.

2. The liquid crystal display panel according to claim 1, wherein the liquid crystal cell comprises:
two substrates facing each other;
a liquid crystal layer interposed between the two substrates;
a lower polarizer disposed on an outer side of a lower substrate, adjacent to the backlight source, of the two substrates; and an upper polarizer disposed on an outer side of an upper substrate, away from the backlight source, of the two substrates, wherein the polarization adjusting layer is disposed on an outer side of the upper polarizer.

3. The liquid crystal display panel according to claim 1, wherein the polarization adjusting layer is provided on an outer side of the upper polarizer and is combined with the upper polarizer to form a composite film.

4. The liquid crystal display panel according to claim 1, wherein sizes of the optical anisotropic crystal grains are not uniform.

5. The liquid crystal display panel according to claim 1, wherein thicknesses of the polarization adjusting layer along a direction perpendicular to the polarization adjusting layer are not uniform.

6. The liquid crystal display panel according to claim 1, wherein optical axis directions of the optical anisotropic crystal grains dispersed at the different positions in the polarization adjusting layer are not uniform.

7. The liquid crystal display panel according to claim 1, wherein the crystal grains comprise double reflection crystal grains.

8. The liquid crystal display panel according to claim 7, wherein the crystal grains comprise native crystal grains or artificial crystal grains.

9. The liquid crystal display panel according to claim 8, wherein the native crystal grains comprise quartz grains or calcite grains.

10. A liquid crystal display device, comprising:
a liquid crystal display panel, comprising:
a liquid crystal cell;
a backlight source for illuminate the liquid crystal cell; and
a polarization adjusting layer disposed on an outer side of the liquid crystal cell and used to adjust the polarization direction of linear polarized light emitted out from the liquid crystal cell and passing through the polarization adjusting layer,
wherein the polarization adjusting layer comprises a base body and optical anisotropic crystal grains dispersed within the base body wherein the base body of the polarization adjusting layer comprises polyethylene terephthalate (PET),
the linear polarized light after passing through the polarization adjusting layer is adjusted as a light comprising the linear polarized light, another linear polarized light being different from the linear polarized light, a circle polarized light and various types of elliptical polarized light.

11. The liquid crystal display device according to claim 10, wherein the liquid crystal cell comprises:
two substrates facing each other;
a liquid crystal layer interposed between the two substrates;
a lower polarizer disposed on an outer side of a lower substrate, adjacent to the backlight source, of the two substrates; and
an upper polarizer disposed on an outer side of an upper substrate, away from the backlight source, of the two substrates,
wherein the polarization adjusting layer is disposed on an outer side of the upper polarizer.

12. The liquid crystal display device according to claim 10, wherein the polarization adjusting layer is provided on an outer side of the upper polarizer and is combined with the upper polarizer to form a composite film.

13. The liquid crystal display device according to claim 10, wherein sizes of the optical anisotropic crystal grains are not uniform.

14. The liquid crystal display device according to claim 10, wherein thicknesses of the polarization adjusting layer along a direction perpendicular to the polarization adjusting layer are not uniform.

15. The liquid crystal display device according to claim 10, wherein optical axis directions of the optical anisotropic crystal grains dispersed at the different positions in the polarization adjusting layer are not uniform.

16. The liquid crystal display device according to claim 10, wherein the crystal grains comprise double reflection crystal grains.

17. The liquid crystal display device according to claim 16, wherein the crystal grains comprise native crystal grains or artificial crystal grains.

* * * * *